(12) United States Patent
Bahar et al.

(10) Patent No.: US 9,005,411 B2
(45) Date of Patent: Apr. 14, 2015

(54) ELECTROCHEMICAL COMPRESSION SYSTEM

(71) Applicant: Xergy Incorporated, Georgetown, DE (US)

(72) Inventors: Bamdad Bahar, Chester, MD (US); Walther Grot, Bear, DE (US); William Parmelee, Seaford, DE (US)

(73) Assignee: Xergy Inc, Georgetown, DE (US)

( * ) Notice: Subject to any disclaimer, the term of this patent is extended or adjusted under 35 U.S.C. 154(b) by 106 days.

(21) Appl. No.: 13/739,539

(22) Filed: Jan. 11, 2013

(65) Prior Publication Data

US 2014/0027304 A1    Jan. 30, 2014

Related U.S. Application Data

(60) Provisional application No. 61/631,750, filed on Jan. 11, 2012.

(51) Int. Cl.
*C25B 1/00* (2006.01)
*C25B 1/02* (2006.01)
*H01M 8/04* (2006.01)
*C25B 9/00* (2006.01)
*H01M 8/24* (2006.01)

(52) U.S. Cl.
CPC ... *C25B 1/02* (2013.01); *C25B 9/00* (2013.01); *H01M 8/241* (2013.01); *H01M 8/247* (2013.01); *Y02E 60/528* (2013.01); *H01M 8/04074* (2013.01)

(58) Field of Classification Search
CPC .................................... C25B 1/00; C25B 1/02

USPC .......................... 204/263, 265; 205/615, 637
See application file for complete search history.

(56) References Cited

U.S. PATENT DOCUMENTS

| | | | | |
|---|---|---|---|---|
| 5,164,060 A * | 11/1992 | Eisman et al. | | 204/282 |
| 6,321,561 B1 * | 11/2001 | Maget | | 62/498 |
| 8,640,492 B2 * | 2/2014 | Bahar | | 62/500 |
| 8,769,972 B2 * | 7/2014 | Bahar | | 62/115 |
| 2008/0090125 A1* | 4/2008 | Okuyama et al. | | 429/30 |
| 2010/0143823 A1* | 6/2010 | Tanaka et al. | | 429/483 |
| 2012/0138456 A1* | 6/2012 | Spurgeon et al. | | 204/252 |

FOREIGN PATENT DOCUMENTS

WO    WO 2011103188 A2 *  8/2011

* cited by examiner

*Primary Examiner* — Nicholas A Smith
(74) *Attorney, Agent, or Firm* — Invention To Patent Services; Alex Hobson (57) ABSTRACT

An electrochemical compressor includes one or more electrochemical cells through which a working fluid flows, and an external electrical energy source electrically connected to the electrochemical cell. Each electrochemical cell includes an anode connected to the electrical energy source; a cathode connected to the electrical energy source; an ion exchange membrane disposed between and in electrical contact with the cathode and the anode to pass an electrochemically motive material of the working fluid from the anode to the cathode, the ion exchange membrane comprising polar ionic groups attached to nonpolar chains; and a non-aqueous solvent comprising polar molecules, the polar molecules of the non-aqueous solvent being associated with and electrostatically attracted to the polar ionic groups of the ion exchange membrane.

15 Claims, 8 Drawing Sheets

ELECTROCHEMICAL COMPRESSION SYSTEM

CROSS-REFERENCE TO RELATED APPLICATIONS

This application claims priority to U.S. Application No. 61/631,750, filed on Jan. 11, 2012 and entitled "Electrochemical Compression Systems for Refrigeration Applications," which is incorporated herein by reference in its entirety.

TECHNICAL FIELD

The disclosed subject matter relates to an electrochemical compression system having an electrochemical compressor.

BACKGROUND

An electrochemical compressor is a device that raises the pressure of a component of a working fluid using an electrochemical process.

SUMMARY

In some general aspects, an electrochemical compressor through which a working fluid flows includes one or more electrochemical cells and an external electrical energy source. Each electrochemical cell includes an anode connected to the electrical energy source; a cathode connected to the electrical energy source; an ion exchange membrane disposed between and in electrical contact with the cathode and the anode to pass an electrochemically motive material of the working fluid from the anode to the cathode, the ion exchange membrane comprising polar ionic groups attached to nonpolar chains; and a non-aqueous solvent comprising polar molecules. The polar molecules of the non-aqueous solvent are associated with and electrostatically attracted to the polar ionic groups of the ion exchange membrane.

Implementations can include one or more of the following features. For example, the polar ionic groups attached to the nonpolar chains can form an ionomer. The ionomer can include elastic channels that pass between polar ionic groups. The elastic channels can be expanded by the non-aqueous solvent molecules to a size that ranges between about 100 nm to about 500 nm, and more particularly to between about 200 nm to 400 nm. The ionomer can include sulfonated perfluorinated polymer or sulfonated polymer.

The polar ionic groups attached to nonpolar chains can be part of an ionomer that is mechanically reinforced with a non-ionic fibrous medium.

The working fluid can include an electrochemically-active component.

The working fluid can include a condensable refrigerant that can be made into the electrochemically motive refrigerant. The working fluid can include a mixture of ammonia and hydrogen.

The solvent can include one or more of di ether glycol, dimethyl ether, and diethyl ether.

The ion exchange membrane can include a copolymer of tetrafluoroethylene and perfluoro-3,6-dioxa-4-methyl-7-octene-sulfonic acid.

The anode and the cathode can be gas diffusion electrodes.

In another general aspect, an electrochemical compression system includes the electrochemical compressor, which raises a pressure of a working fluid; a condenser that transfers heat from a first heat reservoir to the working fluid; an evaporator that transfers heat from the working fluid to a second heat reservoir; and an expansion valve between the condenser and the evaporator that reduces pressure of the working fluid. The electrochemical compressor is between the condenser and the evaporator.

Implementations can include one or more of the following features. For example, the pressure of the working fluid at the anode side of the electrochemical compressor can be lower than the pressure of the working fluid at the cathode side of the electrochemical compressor.

In other general aspect, an electrochemical compressor is prepared for use in an electrochemical compression system in which a working fluid flows. The method includes solvating a non-aqueous solvent comprising polar molecules with an ion exchange membrane by associating the polar molecules of the non-aqueous solvent with polar ionic groups attached to nonpolar chains of the ion exchange membrane so that the non-aqueous solvent is electrostatically attracted to the polar ionic groups of the ion exchange membrane. The method includes electrically connecting an anode and a cathode to an electrical energy source; disposing the solvated ion exchange membrane between the anode and the cathode; and applying an electric potential gradient across the ion exchange membrane through the anode and cathode to thereby enable an electrochemically motive material formed from the working fluid to pass from the anode to the cathode through the ion exchange membrane.

Implementations can include one or more of the following features. For example, the ion exchange membrane can be solvated with the non-aqueous solvent by swelling openings that are formed between the polar ionic groups. The openings can be swelled by expanding the openings to a size that enables the free transport of the electrochemically motive material formed from the working fluid through the ion exchange membrane.

The working fluid can include hydrogen and a condensable refrigerant, and the electrochemically motive material that formed from the working fluid can include positively charged cations of the refrigerant. The positively charged cations of the refrigerant can be ammonium ions and the working fluid can include ammonia and hydrogen.

The ion exchange membrane can be solvated with the non-aqueous solvent by forming a shell of the solvent at the polar ionic groups of the ion exchange membrane.

In another general aspect, a method of electrochemical compression includes receiving a working fluid at a first pressure, the working fluid comprising molecules of a condensable refrigerant and molecules of hydrogen; oxidizing the molecular hydrogen into hydrogen ions and electrons; protonating the condensable refrigerant with the hydrogen ions to form positively charged cations of the refrigerant at an anode electrically contacting a first side of an ion exchange membrane; migrating the positively charged cations of the refrigerant across and through the ion exchange membrane toward a second side of the ion exchange membrane by applying an electric potential gradient across the ion exchange membrane; de-protonating the hydrogen ions from the positively charged cations of the refrigerant at a cathode electrically contacting the second side of the ion exchange membrane to form the molecules of the condensable refrigerant; reducing the hydrogen ions with electrons into hydrogen; and outputting the working fluid of the molecules of a condensable refrigerant and the molecules of hydrogen at a second pressure that is higher than the first pressure.

Implementations can include one or more of the following features. For example, the molecules of the condensable refrigerant can be ammonia and the positively charged cations of the refrigerant can be ammonium. The positively charged cations of the refrigerant can be migrated across and through the ion exchange membrane by enabling the positively charged cations of the refrigerant to associate and disassociate with a non-aqueous polar solvent within channels formed in the ion exchange membrane.

DESCRIPTION

Figure 1:
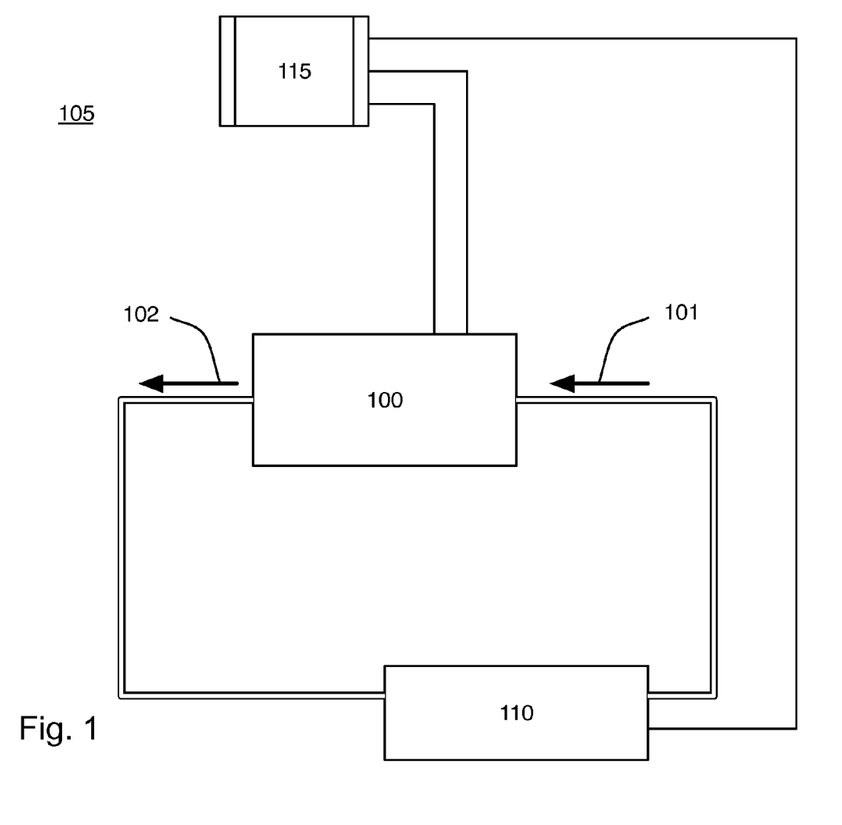
FIG. 1 is a block diagram of an electrochemical compression system.
Figure 2:
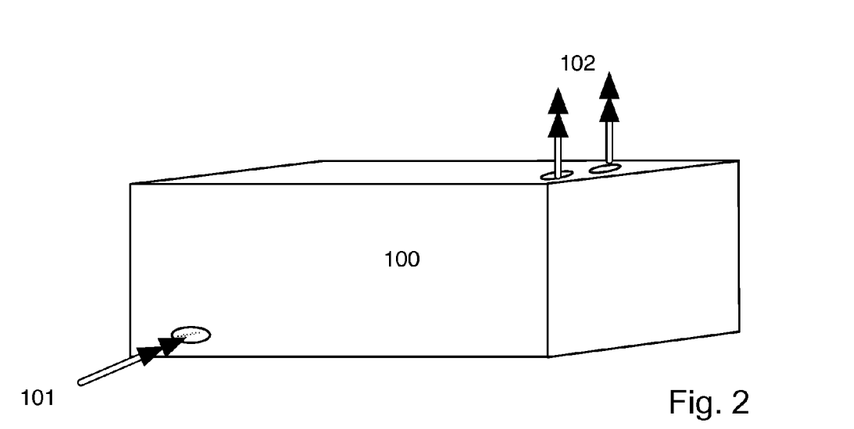
FIG. 2 is a perspective view of an electrochemical compressor used in the electrochemical compression system of FIG. 1.

Referring to FIGS. 1 and 2, an electrochemical compressor 100 can be used in a larger system 105 that uses the raised pressure of the working fluid output from the compressor 100 to act on other components 110 of the system 105 under the control of a control system 115. The direction of flow of the working fluid is depicted by arrows 101, 102, but it should be noted that this direction can be reversed and depends on the other components 110 and the operation of the control system 115. Throughout the specification, reference to a generalized electrochemical compressor 100 does not imply any structural or design limitation to the compressor. The compressor 100 could be designed using any current state of the art designs, or using designs that are described herein.

This disclosure describes a system and method for solvating the ion exchange membrane within the electrochemical cells of the compressor 100 with a non-aqueous solvent. By solvating the membrane with a non-aqueous solvent, the elastic channels within the ion exchange membrane are swelled or expanded beyond the size that they would be expanded to by using an aqueous solvent. A non-aqueous solvent is a fluid (such as a liquid or gas) that includes polar molecules but does not include water ($H_2O$). On the other hand, an aqueous solvent includes water. By expanding the channels using a non-aqueous solvent, larger molecules can be transported or migrated through the ion exchange membrane of the electrochemical cell than previously permitted using an aqueous solvent. For example, for an ion exchange membrane that is made of Nafion™, channel sizes can be expanded using water as a solvent to between 40-120 nm when measured along a direction generally transverse to the flow of the working fluid through the channels. However, Nafion™ can be expanded to greater than 120 nm and in a range of about 200-400 nm when measured along a transverse direction. In this way, larger molecules of the working fluid can be migrated through the ion exchange membrane.

One working fluid that can be used in an electrochemical compressor that needs larger channels (than would be obtained by solvating the membrane with water) to enable migration through the membrane is a working fluid that includes ammonia ($NH_3$), which acts as a condensable refrigerant. Such a working fluid can be a mixture of ammonia and hydrogen ($H_2$). The ammonia acts as a condensable refrigerant in a heat transfer system that incorporates the electrochemical compressor. Additionally, the ammonia can be transformed into ammonium for passage through the ion exchange membrane and thus also serve as an electrochemically motive material. The mixture of ammonia and hydrogen is pressurized as it crosses the ion exchange membrane of the electrochemical compressor.

Figure 3:
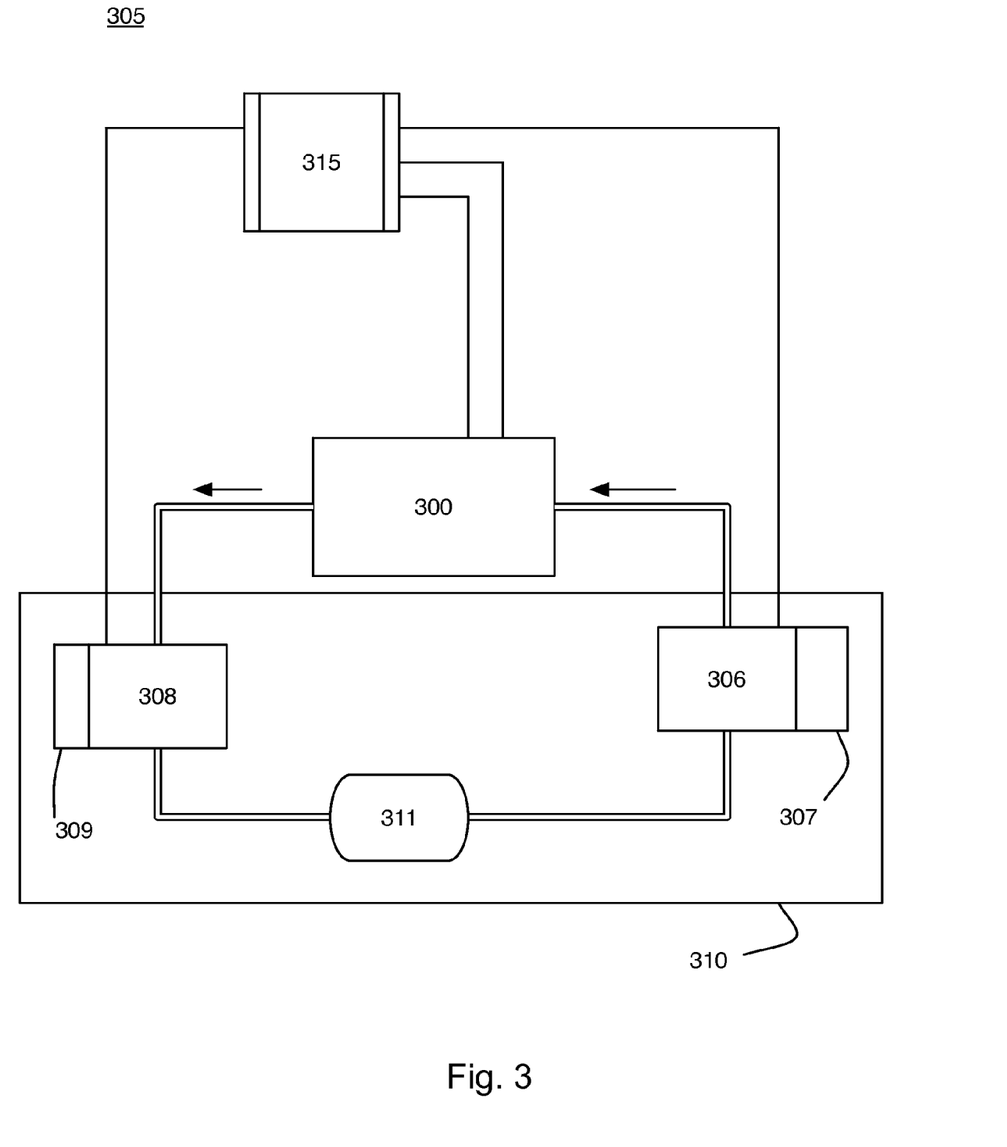
FIG. 3 is a block diagram of an exemplary electrochemical compression system that provides heat transfer.

Referring to FIG. 3, the larger system 105 in which the compressor 100 can be used is a heat transfer system 305, which includes heat transfer components 310 such as an evaporator 306 thermally connected to a heat source 307, a condenser 308 thermally connected to a heat sink 309, and other components 311 that may be used in the system 305. Examples of other components 311 that can be used in the system 305 include expansion devices such as valves, orifices, and capillary tubes, and sensors. In such a refrigeration cycle, heat is moved from the heat source 307 to the heat sink 309. The condenser 308 transfers heat from the working fluid to the heat sink 309 and the evaporator 306 transfers heat from the heat source 307 to the working fluid. The expansion system is between the condenser and the evaporator and reduces pressure of the working fluid. The electrochemical compressor 300 is between the condenser and the evaporator.

Figure 4:
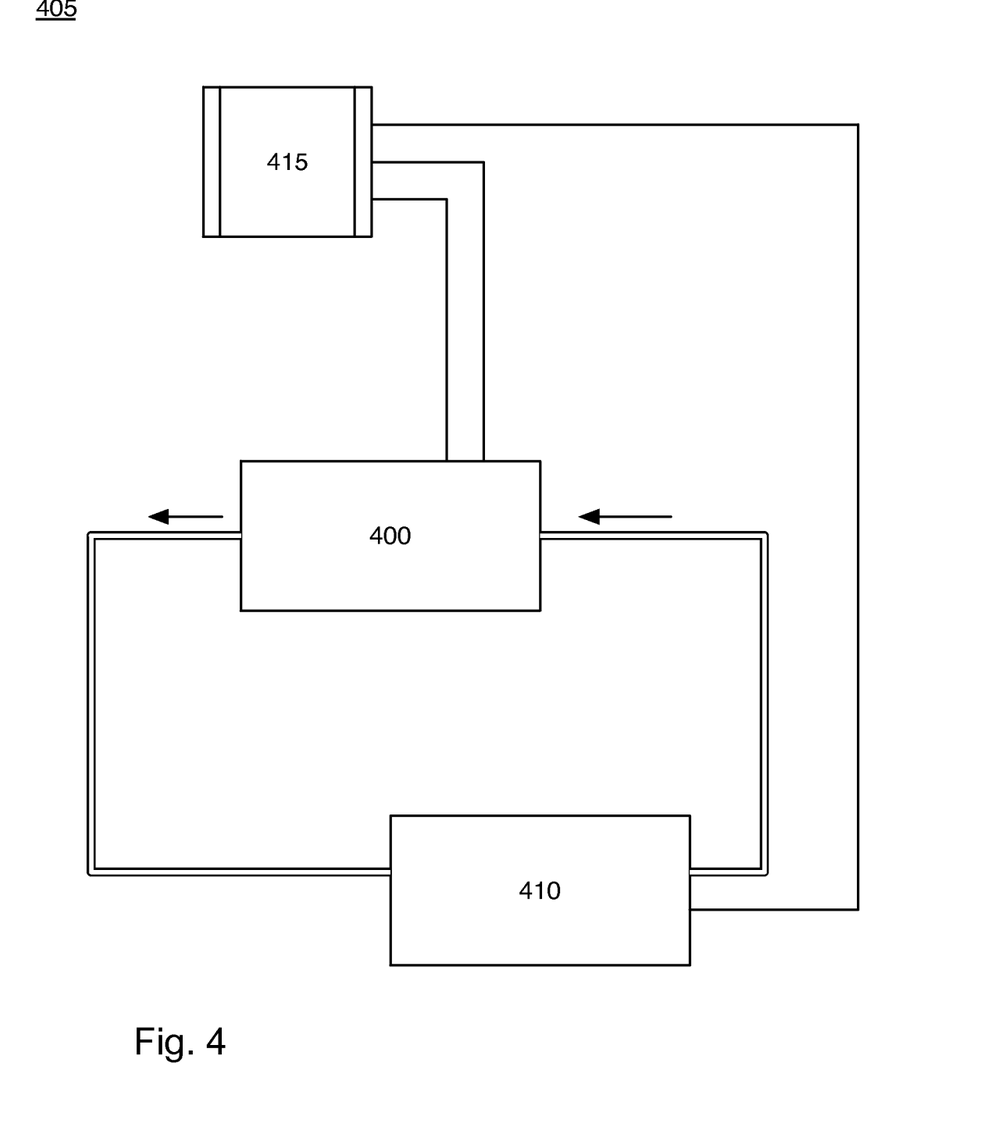
FIG. 4 is a block diagram of an exemplary electrochemical compression system that provides for motion.

Referring to FIG. 4, the larger system 105 in which the compressor 100 can be used is a motive system 405, which converts the raised pressure into work to move one or more items (for example, rotate a shaft) of motive components 410.

Figure 5:
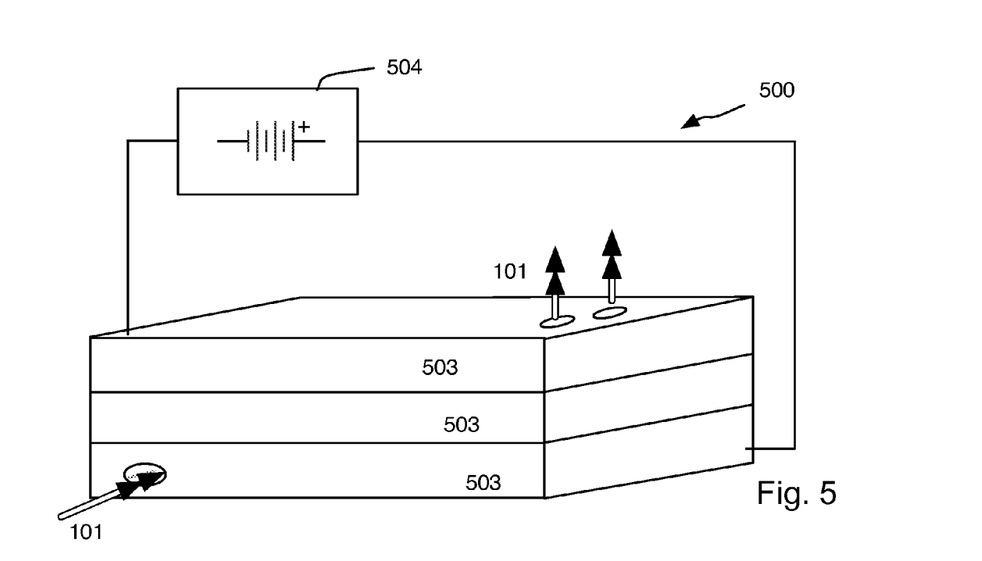
FIG. 5 is a perspective view of an exemplary electrochemical compressor for use in an electrochemical compression system.

Referring to FIG. 5, the electrochemical compressor 500 is typically designed as a multi-stage arrangement or stack of electrochemical cells 503 connected to an external electrical energy source 504. It is also possible to design the electrochemical compressor 500 with just one electrochemical cell connected to the external energy source 504. The external electrical energy source 504 applies an electric potential gradient across the ion exchange membrane of each cell 503 in the stack.

Figure 6:
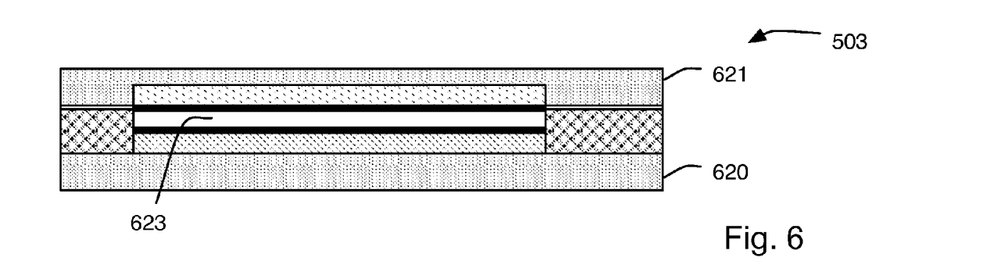
FIG. 6 is a side cross-sectional view of a single electrochemical cell that can be used in the electrochemical compressor of FIG. 5.

Referring also to FIG. 6, the simplest electrochemical cell 503 includes at least two electrodes 620, 621 and one or more ion exchange membranes (or electrolytes) 623. The ion exchange membrane 623 is disposed between and in intimate electrical contact with the electrodes 620, 621 to pass the working fluid. That is, the exchange membrane 623 and electrodes 620, 621 are close enough to each other to provide an electrical conduction between the membrane 623 at each side and the respective electrode. The electrode at which the electron producing oxidation reaction occurs is the anode 620. The electrode at which an electron consuming reduction reaction occurs is called the cathode 621. The direction of the electron flow in the external circuit is from anode to cathode. In order to drive the electrolysis reaction, electric power is applied to the cell electrodes from the source 504 of the electric power, with the polarity being selected to induce the electrolyte anion flow to the anode and the cation flow to the cathode. The electrolyte can be a solid electrolyte. The electrodes 620, 621 can be gas diffusion electrodes and can act as a catalyst for oxidation (at anode) and reduction (at cathode), and also enable protonation and de-protonation, as discussed below.

The working fluid includes at least a component that can be oxidized at the anode of the compressor and reduced at the cathode of the compressor, such component is considered to be electrochemically active. For example, hydrogen is an electrochemically active component that can be within the working fluid.

The working fluid can include a mixture of an electrochemically active component (such as hydrogen) and a condensable refrigerant that can become electrochemically motive at the anode by undergoing protonation by the addition of the hydrogen ion ($H^+$) produced by the hydrogen after oxidation. Upon protonation, the condensable refrigerant becomes a positively charged cation of the refrigerant.

An electrochemically motive component is one that is able to migrate through the channels of the ion exchange membrane due at least in part to the potential gradient applied across the ion exchange membrane. In one example, the condensable refrigerant in the mixture of the working fluid is ammonia ($NH_3$) and the ammonia undergoes protonation at the anode to become the electrochemically motive component of ammonium ($NH_4^+$).

Other condensable refrigerants that can be used in the working fluid mixture with hydrogen include those that have high volatility (enough to function as a condensable refrigerant within the system) and low molecular weight such as low molecular weight sulfides, alcohols, ethers, thyols, amines, for example, hydrogen sulfide, methanol, dimethyl ether, ethanol, butanol, propanol, and dimethyl sulfide. The condensable refrigerant that can be used in the working fluid mixture that also include hydrogen must be able to undergo protonation, and thus interact and receive a proton from the hydrogen ion produced at the anode during oxidation.

The materials of the working fluid are chosen so as not to be reactive with other components within the compressor and overall system in which the compressor is used.

As discussed above, hydrogen can be included in the working fluid. While hydrogen has been traditionally used primarily as the electrochemically active component of the working fluid, hydrogen also possesses useful heat transfer properties. And, in the system described above, hydrogen is disassociated into hydrogen ion and electron at the electrode to enable protonation of the refrigerant. Hydrogen's low density, high specific heat, and thermal conductivity make it an acceptable coolant. Thus, the presence of hydrogen gas within the working fluid can enhance the performance of the condensable refrigerant; and can provide thermal exchange opportunities at points away from thermally conductive surfaces of the fluid conduits and the heat transfer devices.

The choice of the refrigerant depends on the exact application under consideration and other external regulatory factors. Care should be taken in the selection of the refrigerant to ensure that the refrigerant does not degrade the electrochemical performance of the system or poison the electrocatalyst employed in the compressor.

Fluid flow paths or lines are formed in the electrodes 620, 621, respectively, for working fluid to flow into and out of the ion exchange membrane. The electrochemical cell 503 includes at least one inlet opening fluidly connected to the flow path and at least one outlet opening fluidly connected to the flow path. The inlet opening can be formed in the electrode 620 and the outlet opening can be formed in the electrode 621 and optionally both the electrodes 620 and 621.

Central to the operation of the electrochemical cell 503 is the occurrence of oxidation and reduction reactions, which produce or consume electrons. These reactions generally take place at electrode/solution interfaces, where the electrodes are good electronic conductors and the solution should have high ion conductivity. In operation, electric charge is transferred by electrons that travel between the anode and the cathode (from the anode to the cathode) through the external circuit formed from the external energy source. To complete the electric circuit through the cell, an additional mechanism for internal charge transfer and to prevent short circuiting is used. This is provided by the one or more ion exchange membranes (electrolytes) 623 that support charge transfer by ionic conduction. The electrochemical cell 503 can also include one or more gas diffusion layers, one or more spacers, one or more sealants (such as gaskets), and one or more catalysts adjacent to the electrodes to facilitate oxidation and reduction.

Generally speaking, the anode and cathode 620, 621 include a substrate material, such as titanium, graphite, or the like, coated with a catalyst such as lead dioxide, platinum, palladium, or other known materials. The selection of a substrate and the catalyst is determined by the particular electrode reactions, which depend on a given situation. The anode and cathodes can be gas diffusion electrodes.

Generally, the electrolyte 623 is a material that is conductive of ions. In some implementations, the material can be a proton exchange membrane, which is used as electrolytic and catalyst support for providing a reaction of hydrogen oxidation on the one side of membrane and oxygen reduction on the other side. This combination of membrane and electrodes can be called a Membrane Electrode Assembly (MEA).

Figure 7:
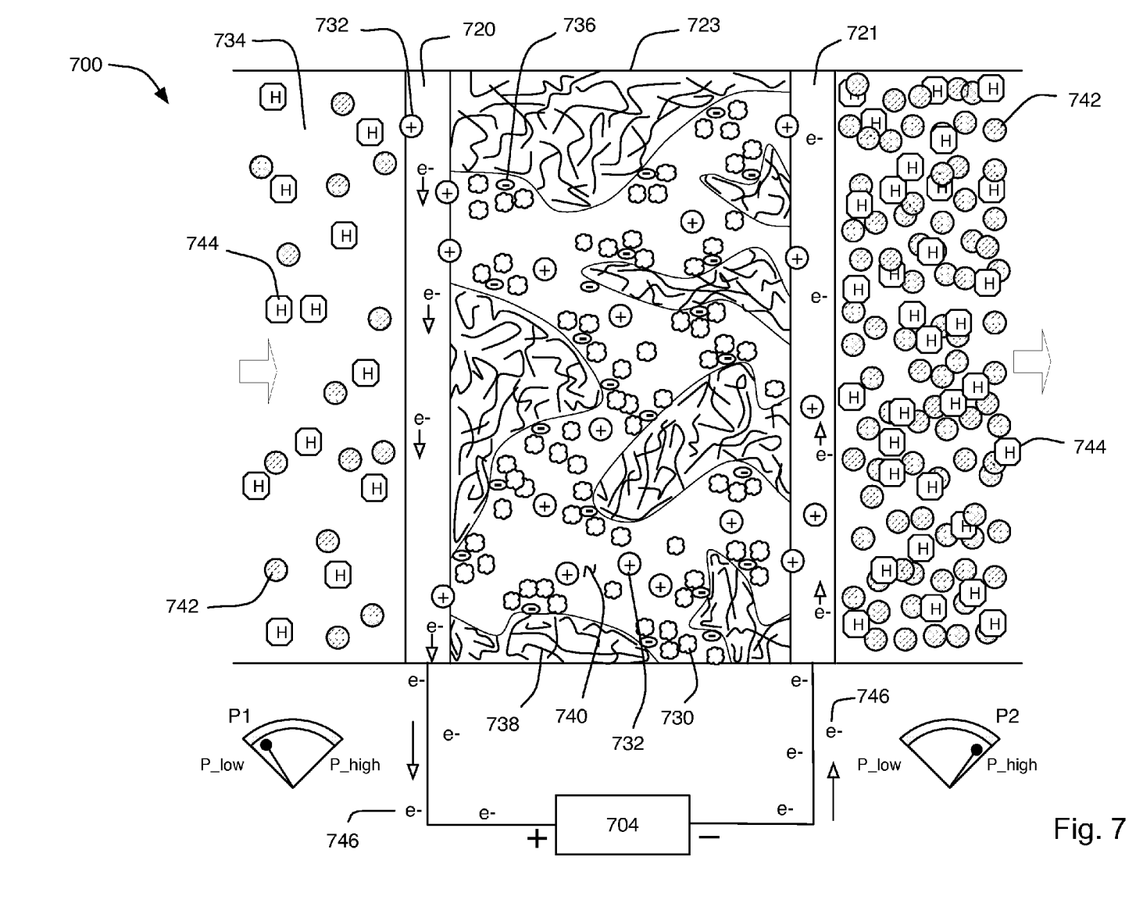
FIG. 7 is a diagram showing the components of an exemplary electrochemical compressor solvated with a non-aqueous solvent.

Referring to FIG. 7, an electrochemical compressor 700 is shown that has been solvated with a non-aqueous solvent 730 (depicted as cloud-shaped molecules). The electrochemical compressor 700 can include a plurality of electrochemical cells, as discussed above, but for clarity only a single electrochemical cell is shown. The electrochemical compressor 700 includes an external electrical energy source 704, an anode 720 connected to the electrical energy source 704, a cathode 721 connected to the electrical energy source 704, and an ion exchange membrane 723 disposed between and in electrical contact with the cathode and the anode. The ion exchange membrane 723 enables the passage of an electrochemically motive material 732 (depicted as a circle with a plus sign), which is formed from the working fluid 734, from the anode 720 to the cathode 721. The ion exchange membrane 723 includes polar ionic groups 736 (depicted as ovals with dashes) attached to nonpolar chains 738. The non-aqueous solvent 730 includes polar molecules, the polar molecules of the non-aqueous solvent 730 being associated with and electrostatically attracted to the polar ionic groups 736 of the ion exchange membrane 723.

The shown in FIG. 7 is merely a schematic of the design of the compressor but the scale of the components, the relative sizes, the relative densities are not accurate.

In the compressor 700 of FIG. 7, the polar ionic groups 736 and the nonpolar chains 738 together form an ionomer, which defines elastic channels 740 that pass between and among the polar ionic groups 736 and clumps of nonpolar chains 738.

In some implementations, the ionomer (736+738) is a sulfonated perfluorinated polymer or a sulfonated polymer. In other implementations, the ionomer is Nafion™, which is a copolymer of tetrafluoroethylene and perfluoro-3,6-dioxa-4-methyl-7-octene-sulfonic acid. In other implementations, the ionomer is poly styrene sulfonic acid, carboxymethyl cellulose, modified polycarboxylic acid, or modified polyvinyl alcohols. The ionomer needs to be able to absorb the polar solvent and transport ions through the polar solvent under an electric field applied by the external energy source 704. The polar solvent 730 can include molecules of one or more of di ether glycol, dimethyl ether, and diethyl ether.

The transportation of the electrochemically motive material 732 through the polar solvent is a function of the current applied across the membrane 723 by the source 74 and also is a function of the characteristics of the membrane 723 and the electrodes 720, 721. There can be drag on the electrochemically motive material 732 which is caused by osmotic action. Thus, other molecules can be dragged with the electrochemically motive material 732 and such drag can be impacted by the current density.

The elastic channels 740 are expanded by the polar solvent 730 prior to using the compressor 700 and by using a non-aqueous polar solvent 730, these channels 740 can expand to sizes that are larger than those previously produced by aqueous polar solvents.

Figure 8:
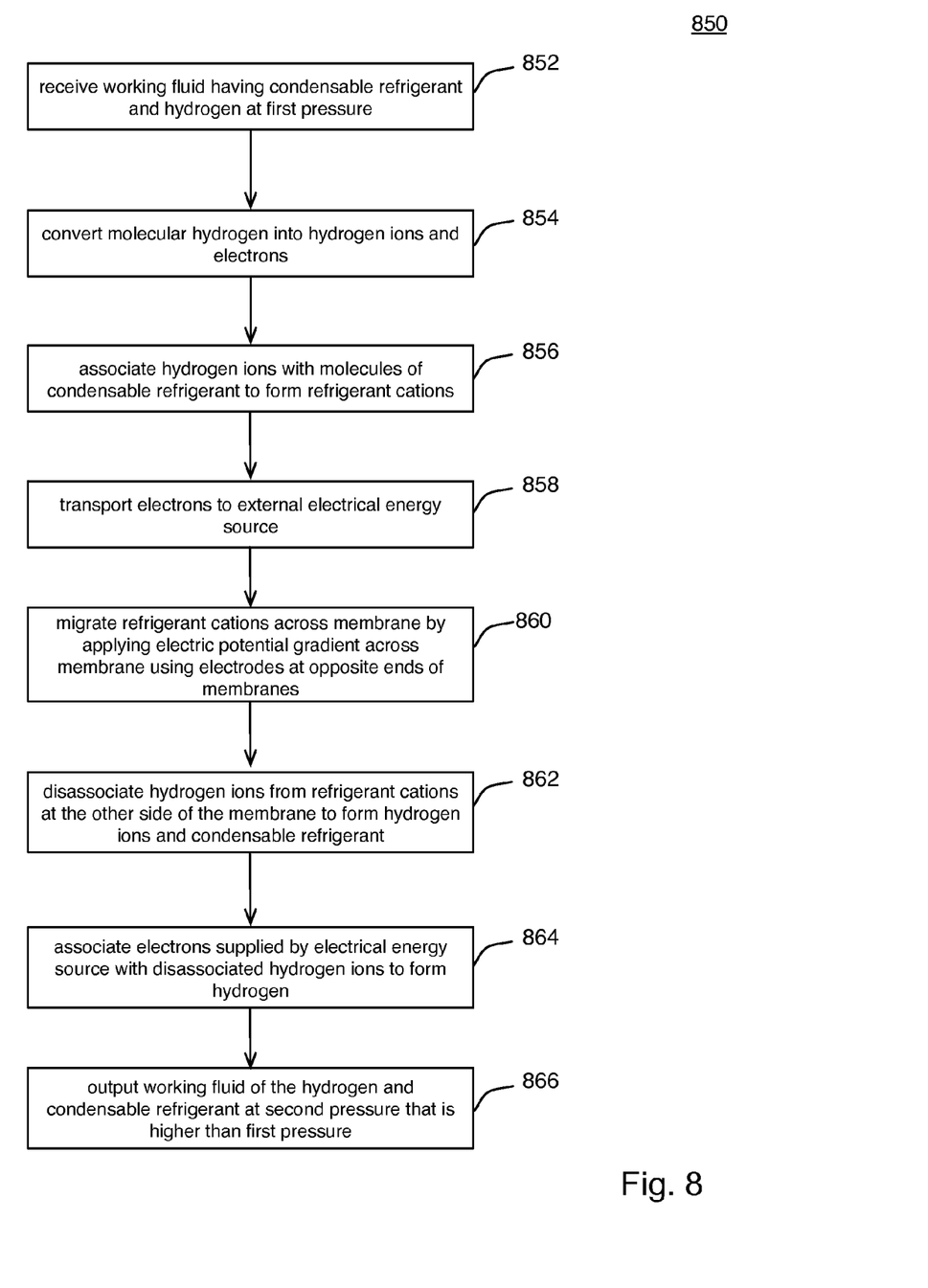
FIG. 8 is a flow chart of an exemplary procedure for electrochemical compression.

In some implementations, the working fluid 734 includes a mixture of molecules of a condensable refrigerant 742 and molecules of hydrogen ($H_2$) 744. At the anode 720, oxidation occurs and hydrogen ions and electrons 746 are formed. Protonation then occurs between the hydrogen ions and the condensable refrigerant 742 to form positively charged cations of the refrigerant, which constitute the electrochemically motive material 732 that can migrate through the membrane 723. In one example, the molecules of the condensable refrigerant 742 are ammonia and the positively charged cations of the refrigerant 732 are ammonium. Referring also to FIG. 8, a procedure 850 is performed for electrochemical compression based on the design of the compressor 700 described herein. The procedure 850 begins by receiving the working fluid 734 at a first pressure P1 (step 852), the working fluid including the molecules of the condensable refrigerant 742 and the molecules of hydrogen 744. The working fluid 734 is received at the anode 720. Next, the molecular hydrogen $H_2$ is oxidized into hydrogen ions H+ and electrons e− 746 (step 854) at the anode catalyst. The reaction is as follows:

$$H_2 \rightarrow 2H+ + 2e-.$$

The molecules of the condensable refrigerant (CF) 742 are protonated with the hydrogen ions (H+) to form positively charged cations (CF+) 732 of the refrigerant at the anode 720 (step 856). The reaction is as follows:

$$CF + H+ \rightarrow CF+.$$

The electrons e− 746 are transported to the external energy source 704 (step 858). The positively charged cations CF+ 732 of the refrigerant are migrated from a first side (at the anode) across and through the ion exchange membrane 723 toward a second side (at the cathode) of the ion exchange membrane by the application of an electric potential gradient across the ion exchange membrane 723 from the source 704 (step 860).

Next, the positively charged cations CF+ 732 of the refrigerant are de-protonating, that is, the hydrogen ions are disassociated from the positively charged cations of the refrigerant, at the cathode to form the molecules of the condensable refrigerant 742 (step 862). The reaction is as follows:

$$CF+ \rightarrow CF + H+.$$

The hydrogen ions H+ and the electrons e− 746 (returning from the source 704) are reduced into hydrogen molecules 744 (step 864) at the cathode catalyst. The reaction is as follows:

$$H+ + e- \rightarrow H_2.$$

These hydrogen molecules $H_2$ 744 and the molecules of the condensable refrigerant CF 742 are mixed to reform the working fluid 734, which is now at a second pressure P2 that is higher than the first pressure P1 and this higher pressure working fluid 734 is output to the rest of the electrochemical compression system (step 866).

The positively charged cations of the refrigerant 732 are migrated across and through the ion exchange membrane 723 by enabling the positively charged cations of the refrigerant 732 to associate and disassociate with the non-aqueous polar solvent 730 within the channels 740 formed in the ion exchange membrane 723.

Figure 9:
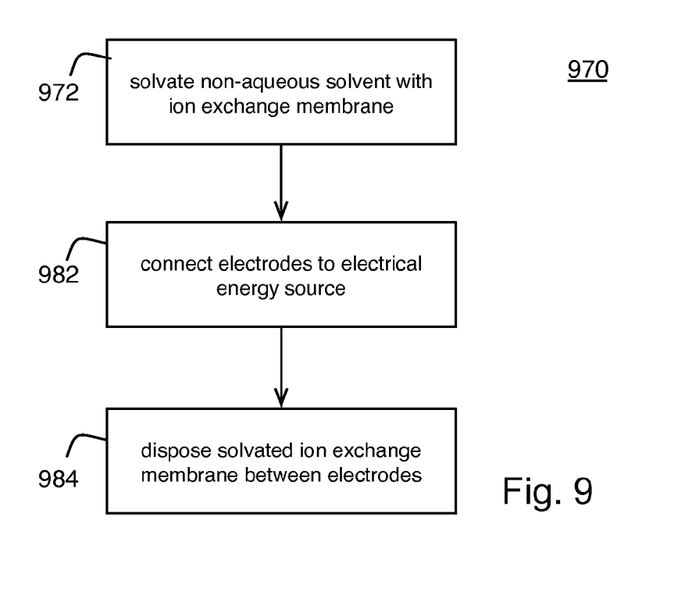
FIG. 9 is a flow chart of an exemplary procedure for preparing the electrochemical compressor of FIG. 7.

Referring to FIG. 9, a procedure 970 is performed to prepare the electrochemical compressor 700 for use in the electrochemical compression system. The ion exchange membrane 723 of the compressor 700 is solvated with non-aqueous solvent 730 (step 972), electrodes 720, 721 are connected to the energy source 704 (step 974), and the solvated ion exchange membrane 723 is disposed between (and in intimate electrical contact with) the electrodes 720, 721 (step 976).

Figure 10:
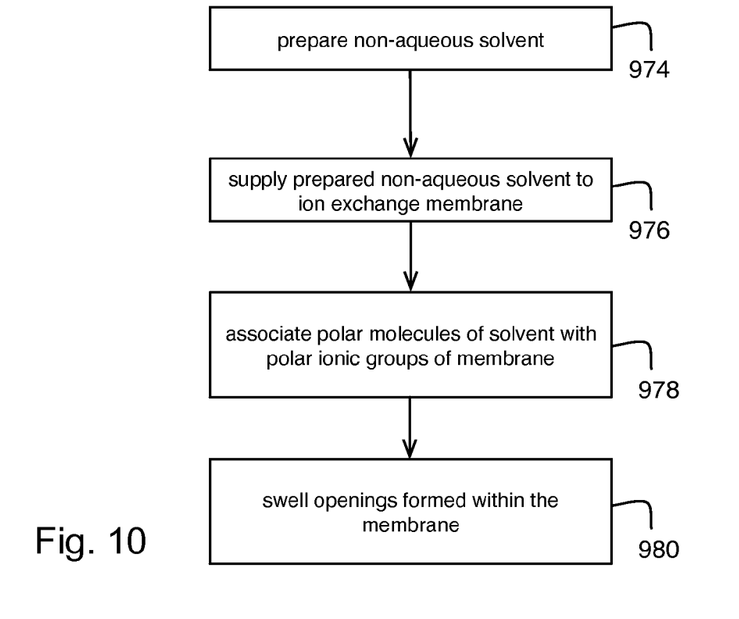
FIG. 10 is a flow chart of an exemplary procedure for solvating an ion exchange membrane of the electrochemical compressor of FIG. 7.
Figure 11A:
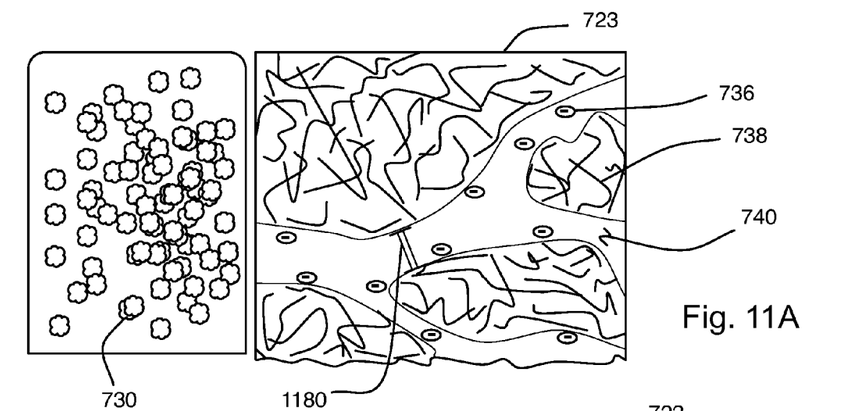
FIGS. 11A-11C show partial views of the diagram of the components of the electrochemical compressor of FIG. 7 at various stages during the solvation procedure of FIG. 10.
Figure 11B:
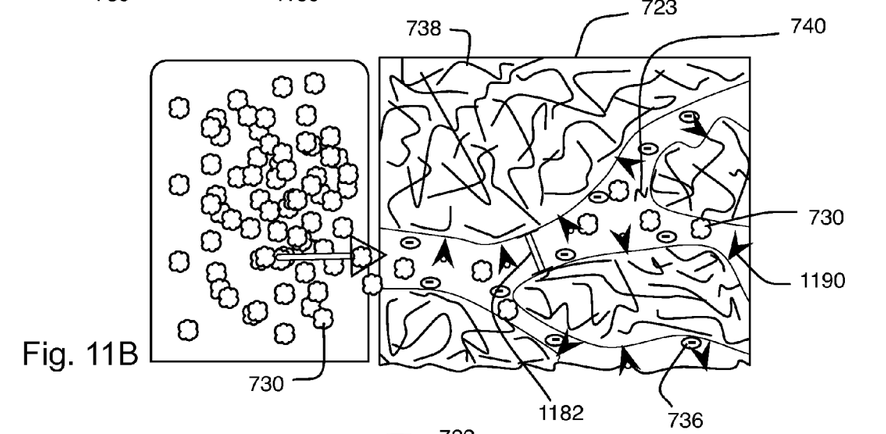
Figure 11C:
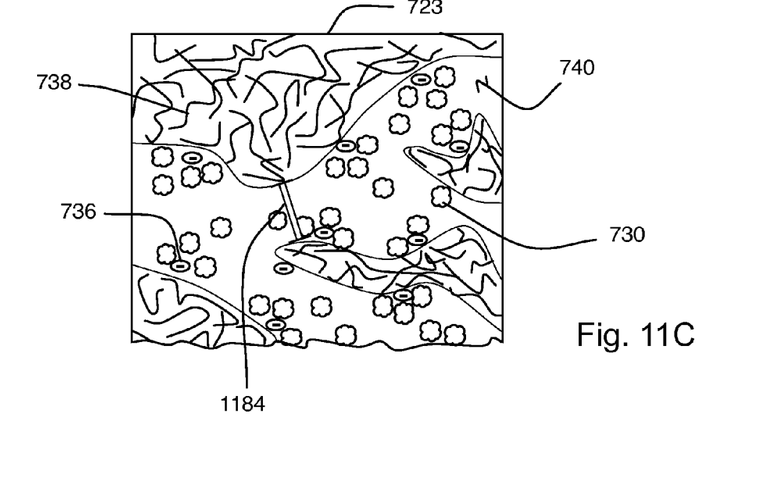

Referring to FIG. 10, a procedure 972 is performed to solvate the ion exchange membrane 723 with the non-aqueous solvent 730. Reference is made to FIGS. 11A-11C, which show partial views of the schematic of the ion exchange membrane, when discussing the procedure 972.

The non-aqueous solvent 730 is prepared (step 974), as shown in FIG. 11A. This step depends on the type of solvent 730 selected for solvation of the membrane 723. The solvent selected can be any suitable polar solvent that can be a very low volatility organic solvent (such as di ether glycol) or a volatile compound that is compatible with the refrigerant within the working fluid 734. Some solvents 730 such as methanol or di ether glycol can be used to swell (or expand) the channels 740 of the membrane 723 more than water. The solvent is selected so that it does not absorb too much of the refrigerant cations 732 that needs to pass through the membrane 723 and so that it is miscible with the refrigerant cations 732. Other non-aqueous solvents 730 that can be used are di methyl ether and diethyl ether.

In any case, because there is no water present, and the electrochemical regime is not as aggressive as in a water-based solvent, a wider range of ionomers for the ion exchange membrane 723 can be used.

Prior to supply of the non-aqueous solvent 730 to the ion exchange membrane 723, elastic channels 740 that are defined between the clumps of nonpolar chains 738 and the polar ionic groups 736 tend to have a range of starting sizes 1180 that are measured along a direction that is transverse to the flow of the solvent 730 (and the refrigerant cations 732) through the channels 740. The starting size range 1180 includes sizes throughout the membrane 723 that are generally too small to accommodate the refrigerant cations 732. Thus, one of the goals achieved by solvating the membrane 723 with a non-aqueous solvent 730 is to expand the elastic channels 740 to a range of finish sizes 1184 that is large enough to accommodate the refrigerant cations 732, which are larger in scale than water molecules.

Next, the prepared non-aqueous solvent 730 is supplied to the ion exchange membrane 723 (step 976), as shown in FIG. 11B, at which point the channels 740 begin to be pushed 1190 by the solvent 730 to a range of intermediate sizes 1182. The molecules of the solvent 730 are polar and therefore are attracted to and associate with the molecules of the polar ionic groups 736 of the membrane 723 (step 978). The molecules of the solvent 730 flow through the channels 740 and dissolve and spread out and start to surround the polar ionic groups 736 of the membrane 723. And, at the same time, the solvent 730 swells (expands) the channels 740 to a range of finish sizes 1184 (step 980), as shown in FIG. 11C.

For example, the elastic channels 740 are expanded by the molecules of the non-aqueous solvent 730 to a size that can range between about 200 nm to about 400 nm, if the ion exchange membrane is Nafion™.

Other implementations are within the scope of the following claims.

In other implementations, the ionomer of the polar ionic groups attached to nonpolar chains can be mechanically reinforced with a non-ionic medium. For example, microporous expanded Teflon™ can be imbibed with ionomer. The non-ionic medium can be fibrous, have fibrils, include a microporous film or a fabric, or other mechanically complex structure or scaffold that is electrochemically inactive and provides a physical support for the ionomer.

The ionomer of the ion exchange membrane can be film cast to establish the membrane. Casting methods can provide different physical properties. Thin films of ionomer can be brittle or crack, and thus they can be dissolved in methanol and then recast. Films can be cast on glass, and both carboxymethyl cellulose (CMC) and poly styrene sulfonic acid (PSSA) do not release easily from glass. Optionally, the films can be cast on non-stick surfaces such as Teflon™ or FEP or polyolefin films such as SARAN™ wrap. Another option is to cast the films within the matrix of a porous membrane such as a very open porous structure of expanded Teflon™ (with interconnected nodes and fibrils) or another porous medium such as a polyethylene membrane or a polyester substrate. A fibrous medium such as fiber glass, ceramic fiber, or polymer fiber can be a suitable substrate. Additionally, the ionomer can be case with fiber reinforcement in the solution such as fiber glass, or a fiber of TEFLON™, or polymeric fiber or ceramic fiber. The general idea is to reinforce the ionomer before assembly or during solvation Thinner membranes 723 reduce the distance the refrigerant cations need to travel and as a result can enhance performance. Reinforcing the membrane 723 permits ultra-thin membranes to be formed below 25 microns in thickness or below 10 microns in thickness or below 1 micron in thickness, for example.

Mentioned above, compatible ionomers are used as binder with the catalyst of the electrodes. These electrode inks can be sprayed onto the membrane or printed onto the membrane or a suitable substrate or cast and then pressed against the membrane with assured bonding.

Additionally, though not required, it is possible to also include an aqueous solvent with the non-aqueous solvent (such as ammonium hydroxide).

What is claimed is:

1. An electrochemical compressor through which a working fluid flows, the electrochemical compressor comprising:
   an external electrical energy source; and
   one or more electrochemical cells, each electrochemical cell comprising:
      an anode connected to the electrical energy source;
      a cathode connected to the electrical energy source;
      an ion exchange membrane disposed between and in electrical contact with the cathode and the anode to pass an electrochemically motive material of the working fluid from the anode to the cathode, the ion exchange membrane comprising polar ionic groups attached to nonpolar chains; and
      a non-aqueous solvent comprising polar molecules, the polar molecules of the non-aqueous solvent being associated with and electrostatically attracted to the polar ionic groups of the ion exchange membrane
   wherein the working fluid comprises ammonia and hydrogen.

2. The compressor of claim 1, wherein the polar ionic groups attached to the nonpolar chains constitute an ionomer.

3. The compressor of claim 2, wherein the ionomer comprises elastic channels that pass between polar ionic groups.

4. The compressor of claim 3, wherein the elastic channels are expanded by the nonaqueous solvent molecules to a size that ranges between about 200 nm to about 400 nm.

5. The compressor of claim 2, wherein the ionomer comprises sulfonated perfluorinated polymer or sulfonated polymer.

6. The compressor of claim 1, wherein the polar ionic groups attached to nonpolar chains are a part of an ionomer that is mechanically reinforced with a non-ionic fibrous medium.

7. The compressor of claim 1, wherein the working fluid includes an electrochemically active component.

8. The compressor of claim 1, wherein the working fluid includes a condensable refrigerant that can be made into the electrochemically motive refrigerant.

9. An electrochemical compressor through which a working fluid flows, the electrochemical compressor comprising:
   an external electrical energy source; and
   one or more electrochemical cells, each electrochemical cell comprising:
      an anode connected to the electrical energy source;
      a cathode connected to the electrical energy source;
      an ion exchange membrane disposed between and in electrical contact with the cathode and the anode to pass an electrochemically motive material of the working fluid from the anode to the cathode, the ion exchange membrane comprising polar ionic groups attached to nonpolar chains; and
      a non-aqueous solvent comprising polar molecules, the polar molecules of the non-aqueous solvent being associated with and electrostatically attracted to the polar ionic groups of the ion exchange membrane
   wherein the solvent comprise one or more of di ether glycol, dimethyl ether, and diethyl ether.

10. The compressor of claim 1, wherein the ion exchange membrane includes a copolymer of tetrafluoroethylene and perfluoro-3,6-dioxa-4-methyl-7-octene-sulfonic acid.

11. The compressor of claim 1, wherein the anode and cathode are gas diffusion electrodes.

12. A method of preparing an electrochemical compressor for use in an electrochemical compression system in which a working fluid flows, the method comprising:
   solvating a non-aqueous solvent comprising polar molecules with an ion exchange membrane by associating the polar molecules of the non-aqueous solvent with polar ionic groups attached to nonpolar chains of the ion exchange membrane so that the non-aqueous solvent is electrostatically attracted to the polar ionic groups of the ion exchange membrane;
   electrically connecting an anode and a cathode to an electrical energy source;
   disposing the solvated ion exchange membrane between the anode and the cathode; and
   applying an electric potential gradient across the ion exchange membrane through the anode and cathode to thereby enable an electrochemically motive material formed from the working fluid to pass from the anode to the cathode through the ion exchange membrane wherein solvating the non-aqueous solvent with the ion exchange membrane comprises swelling openings that are formed between the polar ionic groups wherein swelling the openings comprises expanding the openings to a size that enables the free transport of the electrochemically motive material formed from the working fluid through the ion exchange membrane;

wherein the working fluid comprises hydrogen and a condensable refrigerant and the electrochemically motive material formed from the working fluid includes positively charged cations of the refrigerant;

wherein the positively charged cations of the refrigerant are ammonium ions and the working fluid comprises ammonia and hydrogen.

13. The method of claim 12, wherein solvating the non-aqueous solvent with the ion exchange membrane comprises forming a shell of the solvent at the polar ionic groups of the ion exchange membrane.

14. A method of electrochemical compression comprising:

receiving a working fluid at a first pressure, the working fluid comprising molecules of a condensable refrigerant and molecules of hydrogen;

oxidizing the molecular hydrogen into hydrogen ions and electrons;

protonating the condensable refrigerant with the hydrogen ions to form positively charged cations of the refrigerant at an anode electrically contacting a first side of an ion exchange membrane;

migrating the positively charged cations of the refrigerant across and through the ion exchange membrane toward a second side of the ion exchange membrane by applying an electric potential gradient across the ion exchange membrane;

de-protonating the hydrogen ions from the positively charged cations of the refrigerant at a cathode electrically contacting the second side of the ion exchange membrane to form the molecules of the condensable refrigerant;

reducing the hydrogen ions with electrons into hydrogen; and outputting the working fluid of the molecules of a condensable refrigerant and the molecules of hydrogen at a second pressure that is higher than the first pressure wherein the molecules of the condensable refrigerant are ammonia and the positively charged cations of the refrigerant are ammonium.

15. The method of claim 14, wherein migrating the positively charged cations of the refrigerant across and through the ion exchange membrane comprises enabling the positively charged cations of the refrigerant to associate and disassociate with a non-aqueous polar solvent within channels formed in the ion exchange membrane.

* * * * *